US011620116B2

(12) United States Patent
Tamm

(10) Patent No.: US 11,620,116 B2
(45) Date of Patent: Apr. 4, 2023

(54) PROGRAMMING LANGUAGE INTEROPERABILITY ENGINE AND ENFORCEMENT IN MULTI-TENANT ENVIRONMENTS

(71) Applicant: salesforce.com, inc., San Francisco, CA (US)

(72) Inventor: Steven Tamm, San Francisco, CA (US)

(73) Assignee: Saleforce, Inc., San Francisco, CA (US)

( * ) Notice: Subject to any disclaimer, the term of this patent is extended or adjusted under 35 U.S.C. 154(b) by 197 days.

(21) Appl. No.: 17/245,666

(22) Filed: Apr. 30, 2021

(65) Prior Publication Data

US 2022/0350577 A1 Nov. 3, 2022

(51) Int. Cl.
 G06F 9/44 (2018.01)
 G06F 8/40 (2018.01)
 G06F 16/245 (2019.01)

(52) U.S. Cl.
 CPC .............. *G06F 8/40* (2013.01); *G06F 16/245* (2019.01)

(58) Field of Classification Search
 CPC ................................ G06F 8/40; G06F 16/245
 USPC .................................................. 717/136–137
 See application file for complete search history.

(56) References Cited

U.S. PATENT DOCUMENTS

| | | | | |
|---|---|---|---|---|
| 8,434,129 | B2 * | 4/2013 | Kannappan | G06Q 10/10 726/22 |
| 8,756,591 | B2 * | 6/2014 | Gschwind | G06F 9/30185 717/146 |
| 9,405,532 | B1 * | 8/2016 | Sullivan | G06F 9/454 |
| 10,673,942 | B2 * | 6/2020 | Illowsky | G06F 8/658 |
| 11,366,723 | B2 * | 6/2022 | Bansod | G06F 11/1451 |
| 2020/0210216 | A1 | 7/2020 | Boilen et al. | |

OTHER PUBLICATIONS

Shwartz et al., "IT Service Provider's Multi-Customer and Multi-Tenant Environments", 2007, IEEE, 8 pages. (Year: 2007).*
Shwartz et al., "Multi-Tenant Solution for IT Service Management: A Quantitative Study of Benefits", 2009, IEEE, pp. 721-731. (Year: 2009).*
Tovarnak et al., "Towards Multi-Tenant and Interoperable Monitoring of Virtual Machines in Cloud", 2012, IEEE, pp. 436-442. (Year: 2012).*
Salim et al., "Towards aWebAssembly Standalone Runtime on GraalVM", 2019, ACM. pp. 15-16. (Year: 2019).*
Chrysafis et al., "FoundationDB Record Layer: A Multi-Tenant Structured Datastore", 2019, ACM, pp. 1787-1802. (Year: 2019).*

(Continued)

*Primary Examiner* — Ted T. Vo
(74) *Attorney, Agent, or Firm* — Holland & Hart LLP

(57) ABSTRACT

Techniques herein enable a tenant of a multi-tenant database to select a programming language to interact with a platform that uses a default programming language. A tenant-specific engine may manage a runtime context associated with the tenant in which a tenant may input code that is translated into the default programming language and executed. During execution, the tenant-specific engine may enforce various multi-tenant protections associated with the tenant. For example, the tenant-specific engine may monitor the runtime context and operations of the translated code, and may enforce computational limitations of the tenant as the translated code is executed.

20 Claims, 9 Drawing Sheets

(56) References Cited

OTHER PUBLICATIONS

Nilsson et al., "Interoperability and Machine-to-Machine Translation Model with Mappings to Machine Learning Tasks", 2019, IEEE, pp. 284-289. (Year: 2019).*

Matin, "Governor Limits In Salesforce," Onilab Blog, May 8, 2022, 10 pages.

Sipek et al., "Exploring Aspects of Polyglot High-Performance Virtual Machine GraalVM," 42nd International Convention on Information and Communication Technology, Electronics, and Microelectronics (MIPRO), May 20, 2019, 6 pages, Opatija, HR.

Deepali, "Salesforce Bets on CIM and Severless," Cloud Analogy, Jan. 1, 2019, 9 pages.

Dhawan, "Salesforce Evergreen—A Game Changer for Developers," Dec. 14, 2019, 3 pages.

Anonymous, "GraalVM," Wikipedia, <https://en.wikipedia.org/w/index.php?title=GraalVM&oldid+1018316758>, last retrieved Apr. 4, 2022, 7 pages.

* cited by examiner

PROGRAMMING LANGUAGE INTEROPERABILITY ENGINE AND ENFORCEMENT IN MULTI-TENANT ENVIRONMENTS

FIELD OF TECHNOLOGY

The present disclosure relates generally to database systems and data processing, and more specifically to a programming language interoperability engine and enforcement in multi-tenant environments.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some systems, a default programming language may be used for handling operations and enabling functionality for a given service. For example, a database friendly programming language may be used to handle database operations due to its scalability, ease of use, and effectivity in performing database operations. Such a language, however, may be complicated to use for development or may be slow relative to other programming languages, which may lead to a lack of adoption by developers or limited available operations or functionality for a given service.

DETAILED DESCRIPTION

Figure 1:
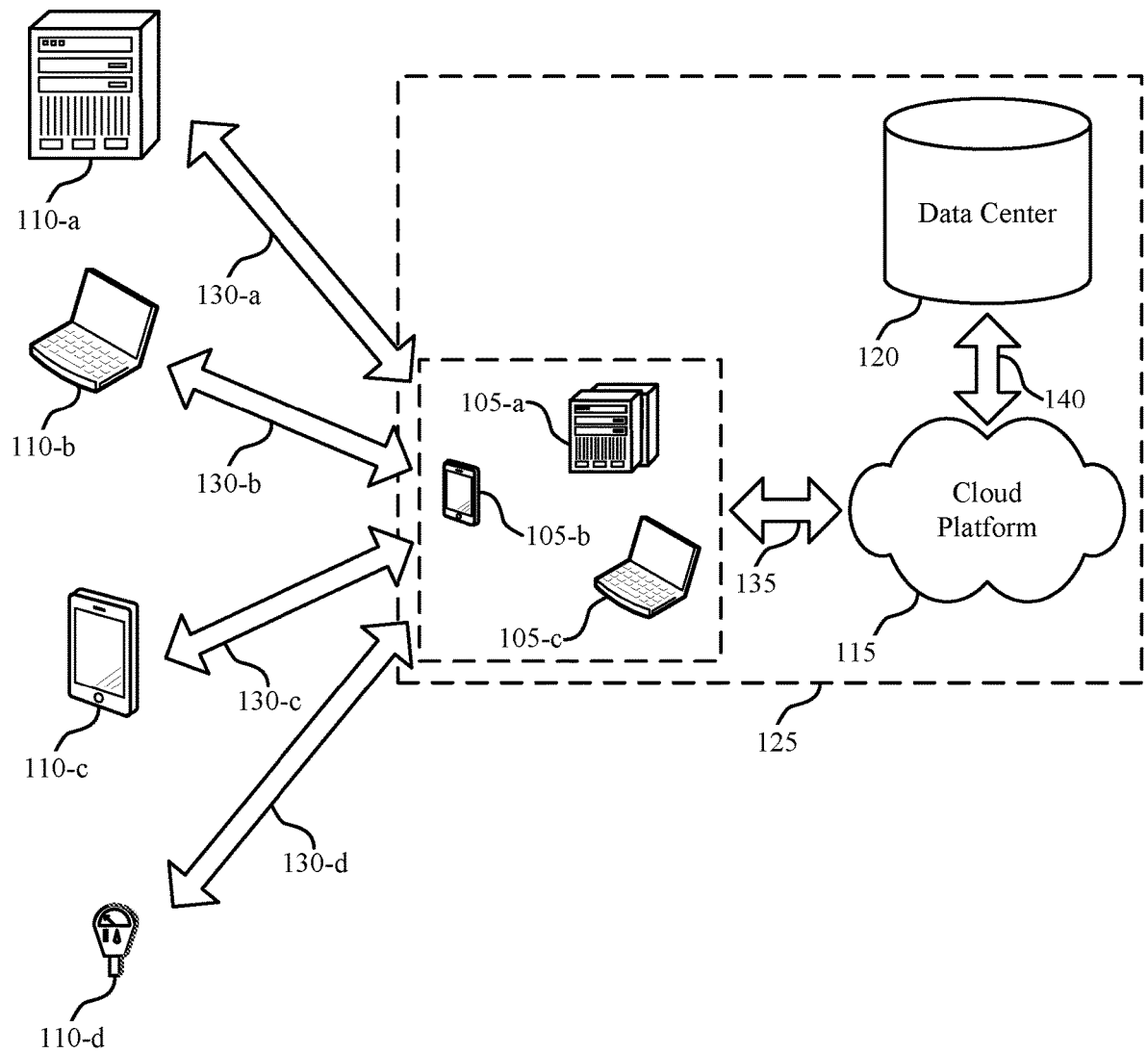
FIG. 1 illustrates an example of a data processing at an application server system that supports a programming language interoperability engine and enforcement in multi-tenant environments in accordance with aspects of the present disclosure.

Some systems may support multi-tenancy and operate as part of a multi-tenant environment, which may be deployed by companies or organizations to provide functionality or features for use by various tenants. The tenants of the multi-tenant environment may be users or customers associated with a given company or organization and may access or use such systems and functionality or features available to the tenant. Different functionality or features may be available for use by different tenants such that each tenant may have access to different subsets of functionality or features based on information associated with the tenant. Further, different computational limits (CPU usage limits, heap/memory usage limits, statement limits, time limits, etc.) may be imposed for different tenants, and such computational limits may be tenant-dependent and defined in a multi-tenant database.

Multi-tenant systems may support different services available for developers, and some services (e.g., core services), or some multi-tenant systems themselves, may utilize a default programming language that handles operations of a service or multi-tenant system. The default programming language may be used based on its scalability or effectivity in performing operations of the service. For instance, an Apex programming language may be used as a default programming language for a given service or platform in multi-tenant environments due to its ease of use or effectivity in performing database operations associated with multi-tenancy. In some cases, however, the default programming language may be complex, inefficient (e.g., slow to compile or execute compared to other programming languages), or may not be widely adopted by developers using the service or system.

According to aspects herein, an application server may enable a tenant of a multi-tenant database to utilize a programming language of their choosing when interacting with a platform supported by the application server that utilize a default programming language. A tenant-specific engine may be initiated that manages a runtime context associated with the tenant. The runtime context may support functionality for a tenant to input code in a programming language of their choosing. For example, developer or user associated with the tenant may select a language to interact with the platform through an Application Programming Interface (API). The developer may use the API to input code in one programming language (Python, Node.js, Ruby, etc.) and a programming language interoperability application may translate the inputted code into the language supported by the platform (e.g., the default programming language). The translated code may be executed and the tenant-specific engine may enforce various multi-tenant protections associated with the programming language to which the input code was translated. For instance, the tenant-specific engine may monitor computational limitations of the tenant, such as tenant-specific processing time (e.g., central processing unit (CPU) time) usage limits, heap or memory usage limits, statement limits, runtime limits, etc., as the translated code is executed. Such techniques may allow flexibility for users in a multi-tenant environment by allowing the users to select a programming language for interacting with a given platform that may only support a default programming language. These techniques also enable multi-tenant protection in environments that may be configured or designed for single tenancy (e.g., environments in which the same computational limitations are applied to multiple or all users) such as the API itself or a programming language interoperability application (e.g., GraalVM).

Techniques herein enable a tenant-specific engine to monitor execution of translated code and the number of operations performed by the programming language interoperability application, which may allow the tenant-specific engine to trigger a runtime exception or refrain from performing additional statements of the translated code when the number of operations exceeds a computational limit of the tenant. Computational limitations may include different sets of computational limits. A first set of computational limits may include limits (e.g., hard limits) associated with the programming language interoperability application such as a processing time limit (e.g., a 7, 10, or 15 minute processing time). A second set of limits may include limits (e.g., soft limits) associated with the default programming language such as a memory usage limit associated with the runtime context, a statement limit, etc. Each of the first and second sets of limits may be tenant-specific such that different tenants may have different limits, some of which may be further dependent on the programming language used for inputting code in the API, among others.

Aspects of the disclosure are initially described in the context of an environment supporting an on-demand database service. Aspects are then described with reference to a data processing system and a process flow. Aspects of the disclosure are further illustrated by and described with reference to apparatus diagrams, system diagrams, and flowcharts that relate to a programming language interoperability engine and enforcement in multi-tenant environments.

FIG. 1 illustrates an example of a system 100 for cloud computing that supports a programming language interoperability engine and enforcement in multi-tenant environments in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

Services or platforms (e.g., cloud platform 115) may support features or functionality for various tenants (e.g., contacts 110) in a multi-tenant environment. Each tenant may be associated with tenant-specific functionality or limitations, which may include access to a subset of features of the service, restricted access or permissions to features or the services, computational limits for use of the service, among others. A given service may also be associated with a default programming language that is used for operations or features for the service. Users or developers associated with a tenant and interacting with the service may choose to learn the default programming language or use a language translator to translate from a language used by the developer into the default programming language. In some cases, the default language may be complex or computationally slow, which may result in developers not choosing to learn the default language. Language translators may increase overhead and may be designed for single tenancy and therefore unable to effectively implement tenant-specific functionality or limitations.

According to techniques herein, subsystem 125 may enable users or developers associated with a tenant in a multi-tenant environment to use a programming language of choice to interact with a given service or platform supported by the subsystem 125, while also enabling tenant-specific functionality in view of tenant-specific limitations. The subsystem 125 may allow users (e.g., contacts 110) associated with a tenant of a multi-tenant database (e.g., data center 120) to access or interact with a service supported by a platform (e.g., cloud platform 115) of the subsystem 125. A programming language interoperability application of the subsystem 125 may be used to translate code associated with a programming language selected by the user that is input into a runtime context associated with the user into translated code associated with the default programming language supported by the platform. A tenant-specific engine of the subsystem 125 may monitor executed instances of the translated code in view of tenant-specific computational limitations such as processing time, memory usage, number of statements executed, total run time, etc., which may be indicated in a multi-tenant database (e.g., of the data center 120). Such techniques supported by the subsystem 125 may allow for programming language flexibility for users interacting with the subsystem 125 while managing and imposing multi-tenant protections, functionality, and features associated with the tenant of the multi-tenant environment, which may reduce overhead, improve user experience, and dynamically manage operations or computations of translated code for each tenant.

According to one example, a user may request to initiate a runtime context for interacting with a service or platform supported by the subsystem 125. The user may be a tenant in a multi-tenant environment and may be associated with tenant-specific computational limitations such as CPU processing time limits, run time limits, memory usage limits, among others. The user may input code of a first programming language into the runtime context (e.g., via an API configured as an interface between the user and components of the subsystem) and the code may be translated from the first programming language to a second programming language (e.g., a default programming language) using an interoperability manager. Instances of the translated code may be executed by the runtime context and a tenant-specific engine may enforce the tenant-specific limits on the runtime context as statements of the translated code are executed. For example, the tenant-specific engine may initiate a runtime exception if tenant-specific limitation is met or exceeded (e.g., if memory usage exceeds a threshold memory usage for the tenant) and may have the runtime context refrain from executing additional statements of the translated code.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
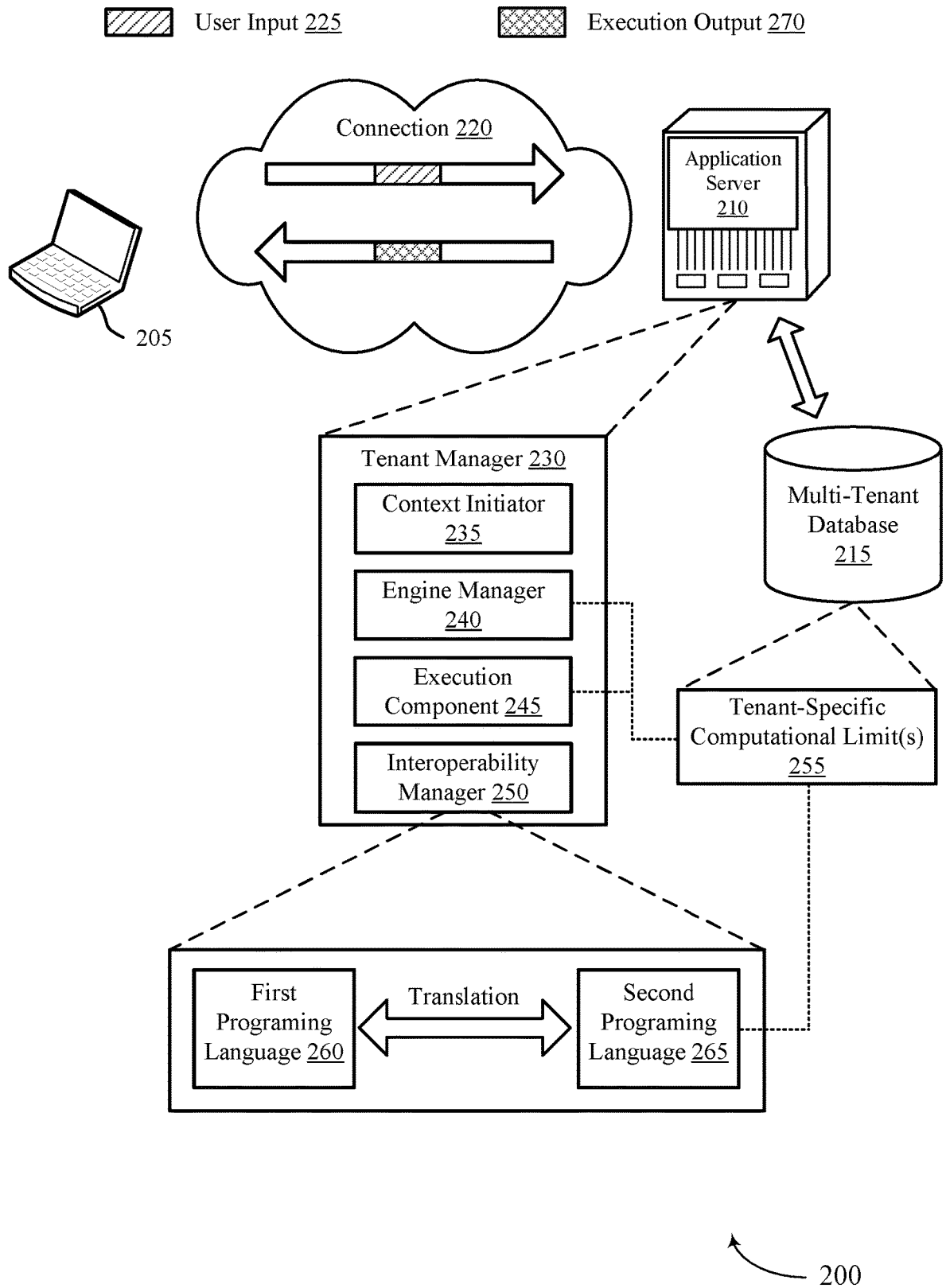
FIG. 2 illustrates an example of a data processing system that supports a programming language interoperability engine and enforcement in multi-tenant environments in accordance with aspects of the present disclosure.

FIG. 2 illustrates an example of a data processing system 200 that supports a programming language interoperability engine and enforcement in multi-tenant environments in accordance with aspects of the present disclosure. The data processing system 200 may be an example of a distributed system or a multi-tenant environment, and may include a user device 205, an application server 210, and a multi-tenant database 215, each of which may be components of a system 100 as described with reference to FIG. 1.

The data processing system 200 may support multi-tenancy and operate as part of a multi-tenant environment having multiple tenants. Each tenant may be associated with various tenant information that may be stored on the multi-tenant database 215. For example, a tenant may have a corresponding tenant identifier (ID) or index within the multi-tenant database 215 used for identifying or accessing tenant-specific information or computational limitations. The tenant may support different user types (e.g., primary or secondary users) or may be associated with an independent software vendors (ISV). For example, a tenant may be a certified ISV, a partner ISV, or a non-certified ISV. A tenant may be associated with a given tenant status, such as an active, suspended, or deactivated tenant.

A user associated with a tenant of a multi-tenant environment may use a user device 205 to establish a connection 220 with the application server 210. The application server 210 may support a platform or service for the user, which may provide various features or functionality to the user. In some aspects, the platform or service may be a core service of the platform and the various features or functionality provided by the application server 210 to the user may be tenant-specific such that different tenants of the multi-tenant environment have access to different features or functionality, have different permissions, or different computational limits, as indicated by corresponding information in the multi-tenant database 215.

In some examples, the user may send a request, such as user input 225, to initiate a runtime context for the user to interact with the application server 210. The application server 210 may include a tenant manager 230 that includes a context initiator 235, which may be an example of a context initiator 425 of FIG. 4 or a context initiator 525 of FIG. 5. The context initiator 235 may be configured to initiate the runtime context for the user based on the request from the user device 205. For example, the context initiator 235 may initiate a runtime context on the application server (or a separate server) for the user, and the runtime context may be specific to the user or the tenant associated with the user. The runtime context may have a corresponding code cache for storing code associated with runtime context.

The tenant manager 230 may also include an engine manager 240, which may initiate a tenant-specific engine for the runtime context initiated by the context initiator 235. The engine manager 240 may initiate the tenant-specific engine using an engine initiator, such as engine initiator 430 of FIG. 4 or engine initiator 530 of FIG. 5, as described herein. The tenant-specific engine may be initiated on the application server 210 (or on another server) and may attach to or be associated with the runtime context for the user.

The user may use the runtime context initiated by the context initiator 235 to interact with a service (e.g., a core service) supported by the application server 210. For example, the user may input code (e.g. as part of user input 225) into the runtime context via an API. The input code may be associated with a first programming language 260 and an interoperability manager 250 may translate the input code from the first programming language 260 to a second programming language 265, which may be a default programming language or other programming language supported by the service for which the user has requested the runtime context. For example, the interoperability manager 250 may be an example of a programming language interoperability application as described herein and may translate instances or statements of the input code into translated code that includes translated instances or statements of the second programming language 265. In some cases, the interoperability manager 250 may be an example of a language translator or other API (e.g., GraalVM) configured to translate one programming language to another.

Figure 4:
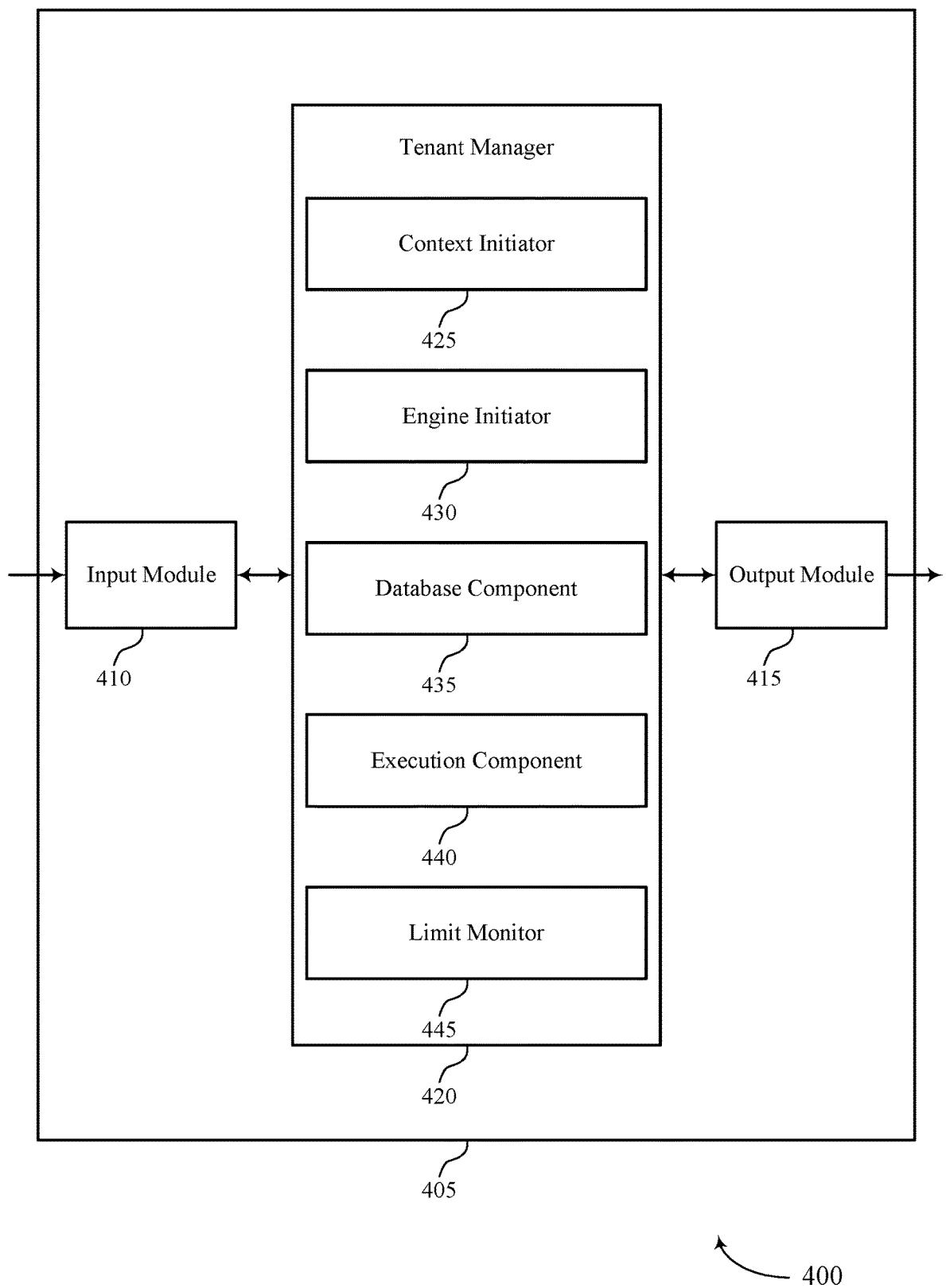
FIG. 4 shows a block diagram of an apparatus that supports a programming language interoperability engine and enforcement in multi-tenant environments in accordance with aspects of the present disclosure.
Figure 5:
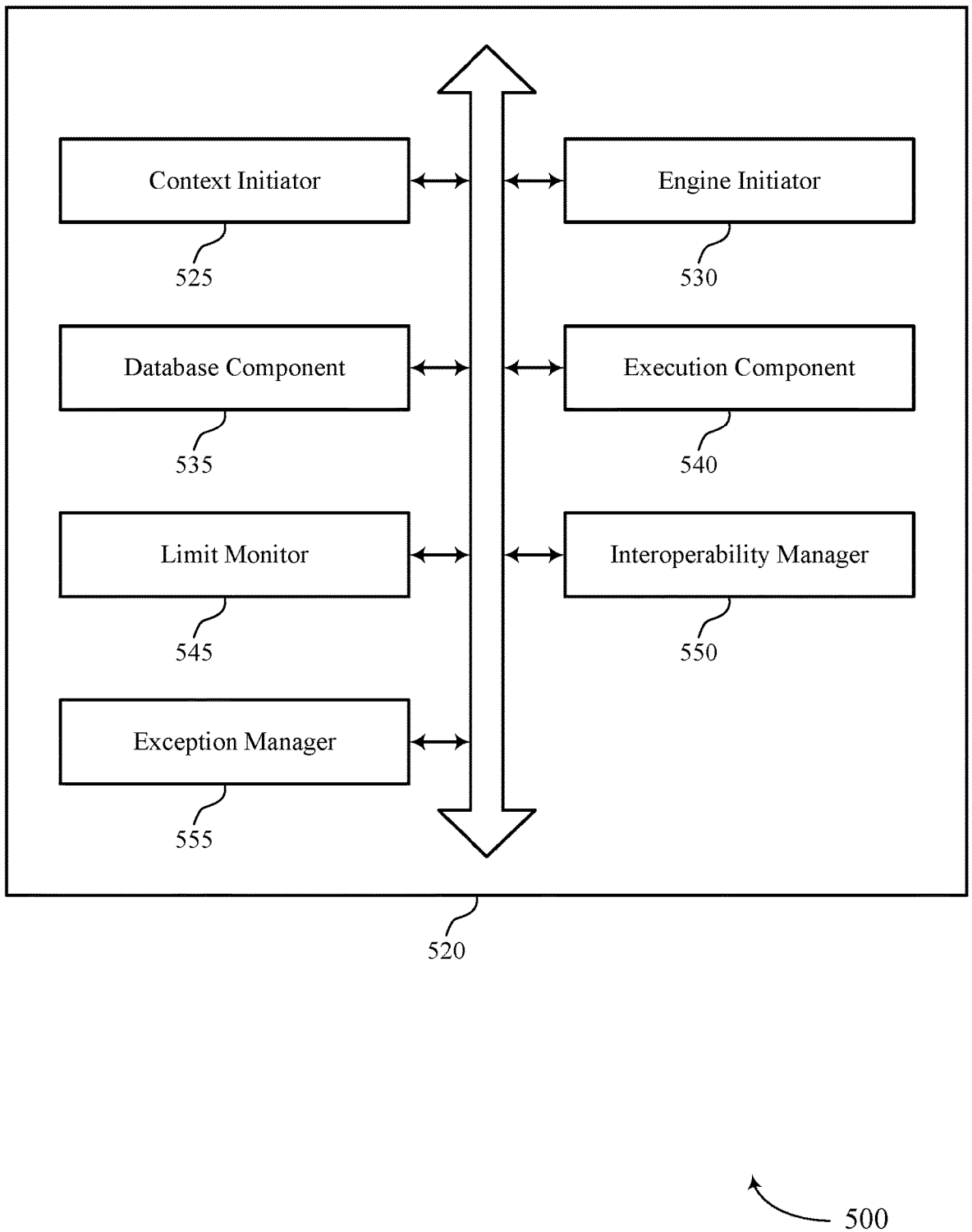
FIG. 5 shows a block diagram of a tenant manager that supports a programming language interoperability engine and enforcement in multi-tenant environments in accordance with aspects of the present disclosure.

After translation, the execution component 245, which may be an example of the execution component 440 of FIG. 4 or the execution component 540 of FIG. 5, may execute one or more instances of the translated code on the application server 210 (or another server) by converting the translated code into machine language used to instruct various components (memory, processor(s), etc.) to perform operations based on the instructions. The execution of the translated code may be monitored by the tenant-specific engine, and the tenant specific engine may enforce tenant-specific computational limits 255 associated with the tenant, the second programming language 265, or both. For example, the engine manager 240 may include a database component (e.g., database component 435 of FIG. 4 or database component 535 of FIG. 5) that accesses the multi-tenant database 215 to obtain a set of tenant-specific computational limits 255 for the tenant associated with the runtime context. The tenant-specific computational limits 255 may include a first set of limits that includes a processor time limit (e.g., CPU usage limit) or total runtime limit and a second set of limits that includes a memory usage limit or a number of statements limit for the runtime context. In some examples, the tenant specific computational limits may vary for a tenant based on the first programming language 260. For example, a tenant may have a first CPU usage limit if the first programming language 260 is Node.js and a second CPU usage limit if the first programming language is Ruby.

According to some aspects, the tenant-specific manager may be configured to monitor one or more statements of the code input into the runtime context and enforce one or more limits (e.g., number of statement limits) before, during, or after translation of the input code into the second programming language 265. For instance, the tenant-specific manager may limit the number of statements input into the interoperability manager for translation into the second programming language 265 or limit the number of statements of translated code that is executed by the execution component 245 by increasing a counter associated with the number of statements for the tenant. If the counter exceeds a number of statements limit of the tenant-specific computational limits 255, the tenant-specific engine may trigger a runtime exception and refrain from having the execution component 245 execute additional instances of the translated code. In some examples, a CPU usage timer may be maintained by the tenant-specific engine or the interoperability manager 250 and if the CPU usage during execution of the translated code exceeds a CPU usage limit of the tenant-specific computational limits 255, the tenant-specific engine may trigger a runtime exception and refrain from having the execution component 245 execute additional instances of the translated code. Similarly, a memory usage indicator may be maintained by the tenant-specific engine or the interoperability manager 250 and if the memory usage indicator during execution of the translated code exceeds a memory usage limit of the tenant-specific computational limits 255, the tenant-specific engine may trigger a runtime exception and refrain from having the execution component 245 execute additional instances of the translated code.

In some cases, the tenant-specific engine may trigger a runtime exception by sending an error message (e.g., as part of execution output 270) to the user device 205 (e.g., using an exception manager 555 of FIG. 5). If no tenant-specific computation limits 255 are reached during execution of the translated code, the application server 210 may perform all operations and instructions of the translated code and indicate successful execution (e.g., as part of execution output 270) to the user device 205.

Figure 3:
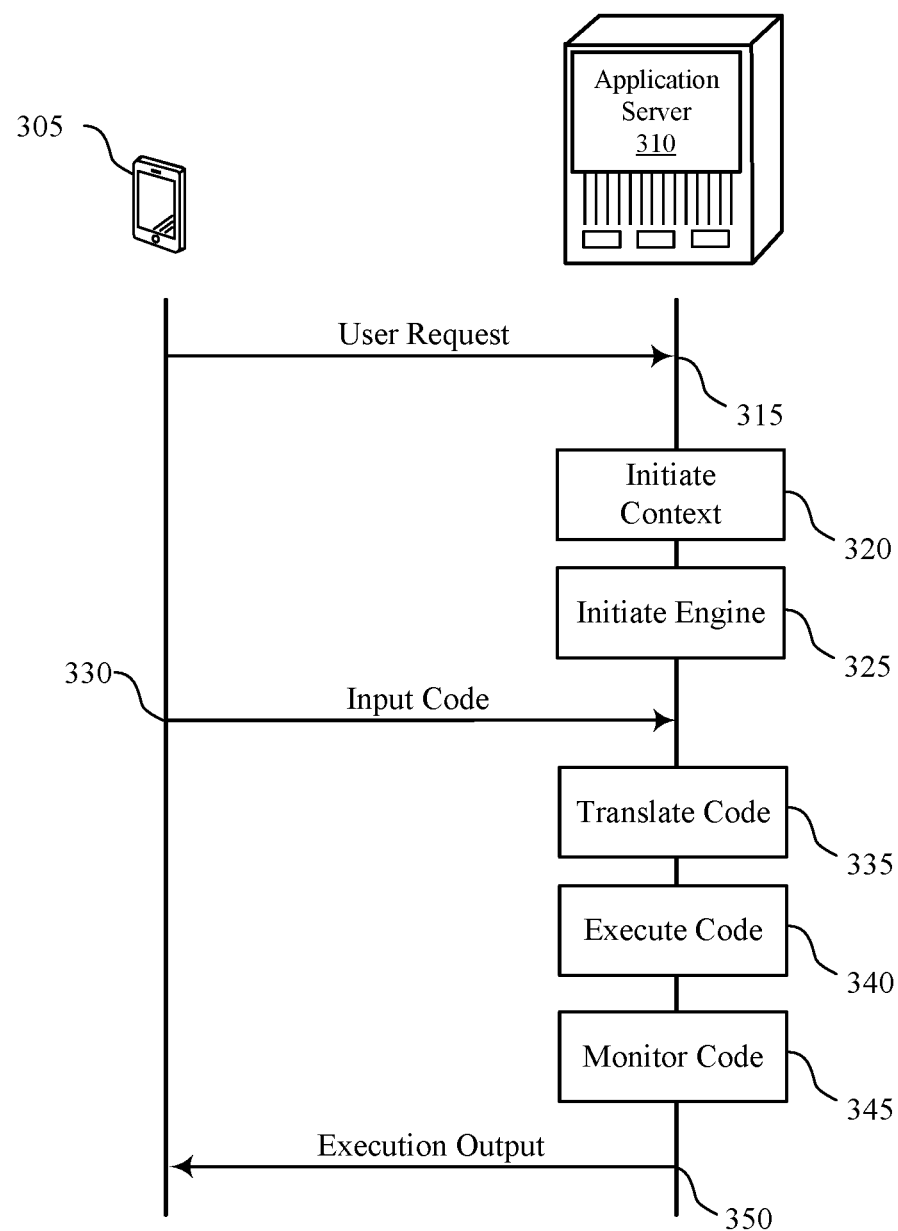
FIG. 3 illustrates an example of a process flow that supports a programming language interoperability engine and enforcement in multi-tenant environments in accordance with aspects of the present disclosure.

FIG. 3 illustrates an example of a process flow 300 that supports a programming language interoperability engine and enforcement in multi-tenant environments in accordance with aspects of the present disclosure. Process flow 300 may include a user device 305 associated with a tenant in a multi-tenant environment and an application server 310, each of which may be examples of the corresponding devices described herein.

At 315, a user of user device 305 may send a user request to the application server 310 to initiate a runtime context for the user.

At 320, the application server 310 may initiate a runtime context for the user based on the request from the user at 315. The runtime context may be initiated by a context initiator or a programming language interoperability application, as described herein. The runtime context may be associated with a code cache for the user and may be for interacting with a platform or service supported by the application server 310 that provides features and functionality for the user. In some examples, the platform or service may be associated with a default programming language used for performing operations and supporting features or functionality of the platform or service. The runtime context may be configured for inputting code associated with a first programming language supported by the programming language interoperability application.

At 325, the application 310 may initiate a tenant-specific engine for the runtime context. The tenant specific engine may be configured to monitor computational limits associated with a second programming language (e.g., the default programming language) supported by the programming language interoperability application. The tenant-specific engine may access a multi-tenant database to obtain computational limits for the tenant associated with the user. For example, the tenant-specific engine may obtain a first set of computational limits for the tenant and a second set of computation limits for the tenant, each of the first set and second set specific to the tenant. In some examples, each of the first and second sets of computational limits is based at least in part on a user type associated with the tenant, a tenant ID of the tenant, a tenant status of the tenant, a code type of the first programming language, or any combination thereof. In some cases, the first set of computational limits includes a processor time limit (e.g., CPU usage time) associated with the programming language interoperability application and the second set of computational limits includes a memory usage limit (e.g., a heap usage limit) associated with the runtime context, a number of statements limit (e.g., a number of input code statements, a number of translated code statements, or a number of executed statements) associated with the runtime context, or a combination thereof.

At 330, the user device 305 may send input code for the runtime context as initiated at 320. The input code may be manually input to the runtime context by the user and may be associated with the first programming language. In some cases, the first programming language may be different than the default programming language supported by the programming language interoperability application.

At 335, the programming language interoperability application may translate the input code from the user device 305 at 330 from the first programming language to the second programming language. In some examples, the tenant-specific engine may monitor the input code before, during, or after translation and impose one or more computational limits associated with the tenant, as described herein.

At 340, the application server 310 may execute one or more instances of translated code associated with the runtime context, where the translated code includes code translated from the first programming language to the second programming language by the programming language interoperability application.

At 345, the application server 310 may monitor, by the tenant-specific engine, the first set of computational limits specific to the tenant and the second set of computational limits specific to the tenant based on the one or more instances of the translated code. For example, the tenant-specific engine may monitor the execution of the one or more instances of the translated code to obtain a number of computations performed by the programming language interoperability application. In some cases, the tenant-specific engine may monitor the one or more instances of the translated code executed by the programming language interoperability application based on the second set of computational limits.

In some aspects, the tenant-specific engine may determine that a number of operations, a counter, or a timer, exceeds a corresponding limit of the tenant-specific computational limits. In such cases, the tenant-specific engine may trigger a runtime exception and may refrain from having additional instances of translated code executed. For example, the tenant-specific engine may initiate a runtime exception based on the number of computations performed by the programming language interoperability application exceeding one of the first set of computational limits or the second set of computational limits. The tenant-specific engine may refrain from executing one or more additional instances of the translated code based on the number of computations performed by the programming language interoperability application exceeding one of the first set of computational limits or the second set of computational limits.

At 350, the application server 310 may indicate execution output, which may include a runtime exception if a tenant-specific limitation was reached or an indication of execution success if all tenant-specific limitations were met.

FIG. 4 shows a block diagram 400 of a device 405 that supports a programming language interoperability engine and enforcement in multi-tenant environments in accordance with aspects of the present disclosure. The device 405 may include an input module 410, an output module 415, and a tenant manager 420. The device 405 may also include a processor. Each of these components may be in communication with one another (e.g., via one or more buses).

The input module 410 may manage input signals for the device 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the device 405 for processing. For example, the input module 410 may transmit input signals to the tenant manager 420 to support a programming language interoperability engine and enforcement in multi-tenant environments. In some cases, the input module 410 may be a component of an I/O controller 610 as described with reference to FIG. 6.

The output module 415 may manage output signals for the device 405. For example, the output module 415 may receive signals from other components of the device 405, such as the tenant manager 420, and may transmit these signals to other components or devices. In some examples, the output module 415 may transmit output signals for display in a user interface, for storage in a database or data store, for further processing at a server or server cluster, or for any other processes at any number of devices or systems. In some cases, the output module 415 may be a component of an I/O controller 610 as described with reference to FIG. 6.

For example, the tenant manager 420 may include a context initiator 425, an engine initiator 430, a database component 435, an execution component 440, a limit monitor 445, or any combination thereof. In some examples, the tenant manager 420, or various components thereof, may be configured to perform various operations (e.g., receiving, monitoring, transmitting) using or otherwise in cooperation with the input module 410, the output module 415, or both. For example, the tenant manager 420 may receive information from the input module 410, send information to the output module 415, or be integrated in combination with the input module 410, the output module 415, or both to receive information, transmit information, or perform various other operations as described herein.

The tenant manager 420 may support data processing at an application server in accordance with examples as disclosed herein. The context initiator 425 may be configured as or otherwise support a means for initiating, by a programming language interoperability application, a runtime context associated with a tenant of a multi-tenant database, the runtime context configured for inputting code associated with a first programming language supported by the programming language interoperability application. The engine initiator 430 may be configured as or otherwise support a means for initiating a tenant-specific engine for the tenant based at least in part on initiating the runtime context, the tenant-specific engine configured to monitor computational limits associated with a second programming language supported by the programming language interoperability application. The database component 435 may be configured as or otherwise support a means for accessing, by the tenant-specific engine, the multi-tenant database to obtain a first set of computational limits specific to the tenant and a second set of computational limits specific to the tenant. The execution component 440 may be configured as or otherwise support a means for executing one or more instances of translated code associated with the runtime context, wherein the translated code comprises code translated from the first programming language to the second programming language by the programming language interoperability application. The limit monitor 445 may be configured as or otherwise support a means for monitoring, by the tenant-specific engine, the first set of computational limits specific to the tenant and the second set of computational limits specific to the tenant based at least in part on the one or more instances of the translated code.

FIG. 5 shows a block diagram 500 of a tenant manager 520 that supports a programming language interoperability engine and enforcement in multi-tenant environments in accordance with aspects of the present disclosure. The tenant manager 520 may be an example of aspects of a tenant manager or a tenant manager 420, or both, as described herein. The tenant manager 520, or various components thereof, may be an example of means for performing various aspects of a programming language interoperability engine and enforcement in multi-tenant environments as described herein. For example, the tenant manager 520 may include a context initiator 525, an engine initiator 530, a database component 535, an execution component 540, a limit monitor 545, an interoperability manager 550, an exception manager 555, or any combination thereof. Each of these components may communicate, directly or indirectly, with one another (e.g., via one or more buses).

The tenant manager 520 may support data processing at an application server in accordance with examples as disclosed herein. The context initiator 525 may be configured as or otherwise support a means for initiating, by a programming language interoperability application, a runtime context associated with a tenant of a multi-tenant database, the runtime context configured for inputting code associated with a first programming language supported by the programming language interoperability application. The engine initiator 530 may be configured as or otherwise support a means for initiating a tenant-specific engine for the tenant based at least in part on initiating the runtime context, the tenant-specific engine configured to monitor computational limits associated with a second programming language supported by the programming language interoperability application. The database component 535 may be configured as or otherwise support a means for accessing, by the tenant-specific engine, the multi-tenant database to obtain a first set of computational limits specific to the tenant and a second set of computational limits specific to the tenant. The execution component 540 may be configured as or otherwise support a means for executing one or more instances of translated code associated with the runtime context, wherein the translated code comprises code translated from the first programming language to the second programming language by the programming language interoperability application. The limit monitor 545 may be configured as or otherwise support a means for monitoring, by the tenant-specific engine, the first set of computational limits specific to the tenant and the second set of computational limits specific to the tenant based at least in part on the one or more instances of the translated code.

In some examples, to support monitoring the first set of computational limits specific to the tenant and the second set of computational limits specific to the tenant, the limit monitor 545 may be configured as or otherwise support a means for monitoring the execution of the one or more instances of the translated code to obtain a number of computations performed by the programming language interoperability application.

In some examples, the exception manager 555 may be configured as or otherwise support a means for initiating a runtime exception based at least in part on the number of computations performed by the programming language interoperability application exceeding one of the first set of computational limits or the second set of computational limits.

In some examples, the execution component 540 may be configured as or otherwise support a means for refraining from executing one or more additional instances of the translated code based at least in part on the number of computations performed by the programming language interoperability application exceeding one of the first set of computational limits or the second set of computational limits.

In some examples, the execution component 540 may be configured as or otherwise support a means for executing, by the programming language interoperability application, the one or more instances of the translated code based at least in part on the first set of computational limits. In some examples, the limit monitor 545 may be configured as or otherwise support a means for monitoring, by the tenant-specific engine, the one or more instances of the translated code executed by the programming language interoperability application based at least in part on the second set of computational limits.

In some examples, the first set of computational limits comprises a processor time limit associated with the programming language interoperability application.

In some examples, the second set of computational limits comprises a memory usage limit associated with the runtime context, a number of statements limit associated with the runtime context, or a combination thereof.

In some examples, each of the first and second sets of computational limits is based at least in part on a user type associated with the tenant, a tenant identifier (ID) of the tenant, a tenant status of the tenant, a code type of the first programming language, or any combination thereof.

In some examples, the interoperability manager 550 may be configured as or otherwise support a means for inputting the code associated with the first programming language to the runtime context. In some examples, the interoperability manager 550 may be configured as or otherwise support a means for translating, by the programming language interoperability application, one or more statements of the code associated with the first programming language to obtain the one or more instances of translated code.

Figure 6:
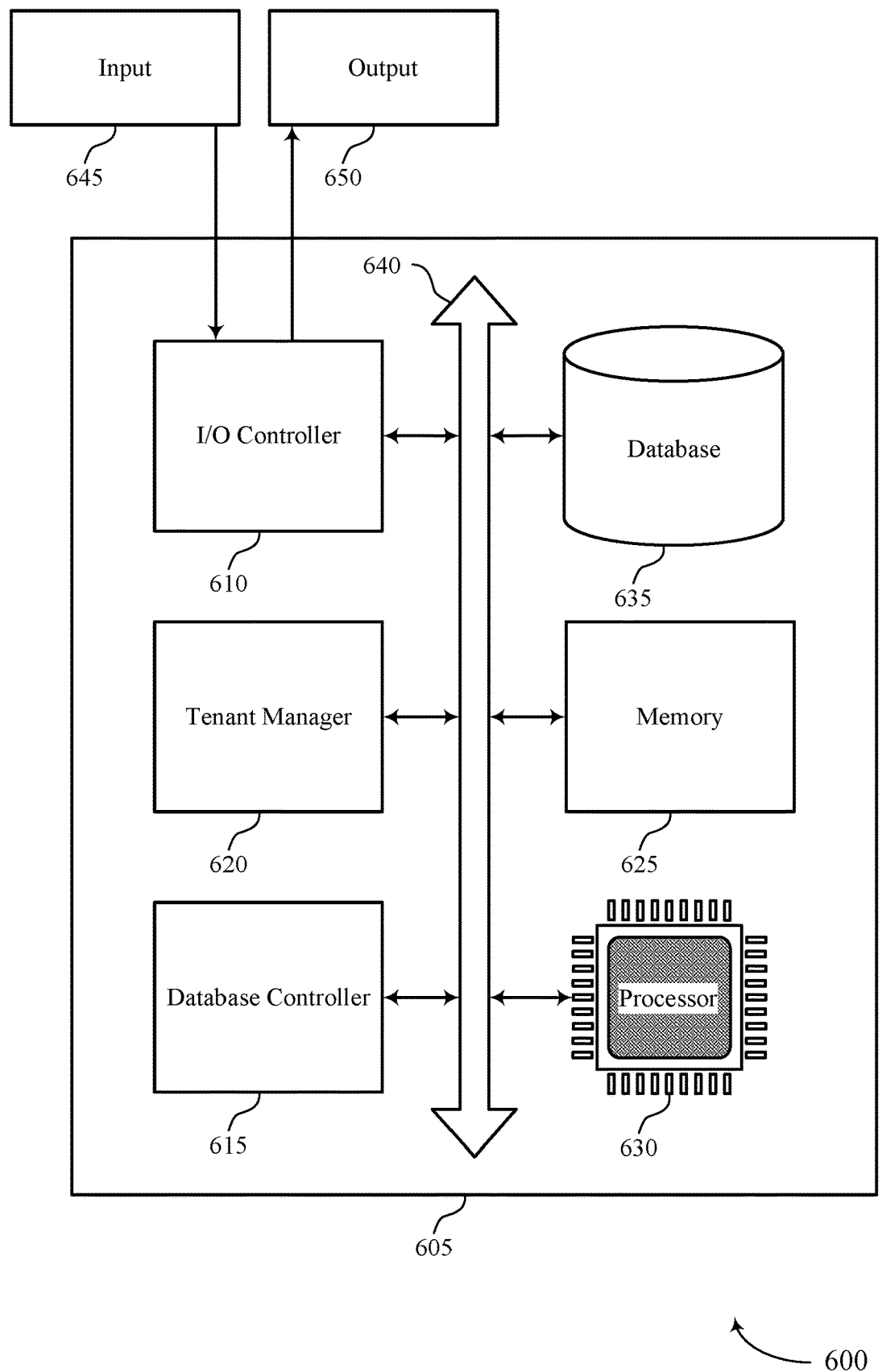
FIG. 6 shows a diagram of a system including a device that supports a programming language interoperability engine and enforcement in multi-tenant environments in accordance with aspects of the present disclosure.

FIG. 6 shows a diagram of a system 600 including a device 605 that supports a programming language interoperability engine and enforcement in multi-tenant environments in accordance with aspects of the present disclosure. The device 605 may be an example of or include the components of a device 405 as described herein. The device 605 may include components for data communications including components for transmitting and receiving communications, such as a tenant manager 620, an I/O controller 610, a database controller 615, a memory 625, a processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of a processor 630. In some examples, a user may interact with the device 605 via the I/O controller 610 or via hardware components controlled by the I/O controller 610.

The database controller 615 may manage data storage and processing in a database 635. In some cases, a user may interact with the database controller 615. In other cases, the database controller 615 may operate automatically without user interaction. The database 635 may be an example of a single database, a distributed database, multiple distributed databases, a data store, a data lake, or an emergency backup database.

Memory 625 may include random-access memory (RAM) and ROM. The memory 625 may store computer-readable, computer-executable software including instructions that, when executed, cause the processor 630 to perform various functions described herein. In some cases, the memory 625 may contain, among other things, a BIOS which may control basic hardware or software operation such as the interaction with peripheral components or devices.

The processor 630 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in a memory 625 to perform various functions (e.g., functions or tasks supporting a programming language interoperability engine and enforcement in multi-tenant environments).

The tenant manager 620 may support data processing at an application server in accordance with examples as disclosed herein. For example, the tenant manager 620 may be configured as or otherwise support a means for initiating, by a programming language interoperability application, a runtime context associated with a tenant of a multi-tenant database, the runtime context configured for inputting code associated with a first programming language supported by the programming language interoperability application. The tenant manager 620 may be configured as or otherwise support a means for initiating a tenant-specific engine for the tenant based at least in part on initiating the runtime context, the tenant-specific engine configured to monitor computational limits associated with a second programming language supported by the programming language interoperability application. The tenant manager 620 may be configured as or otherwise support a means for accessing, by the tenant-specific engine, the multi-tenant database to obtaining a first set of computational limits specific to the tenant and a second set of computational limits specific to the tenant. The tenant manager 620 may be configured as or otherwise support a means for executing one or more instances of translated code associated with the runtime context, wherein the translated code comprises code translated from the first programming language to the second programming language by the programming language interoperability application. The tenant manager 620 may be configured as or otherwise support a means for monitoring, by the tenant-specific engine, the first set of computational limits specific to the tenant and the second set of computational limits specific to the tenant based at least in part on the one or more instances of the translated code.

By including or configuring the tenant manager 620 in accordance with examples as described herein, the device 605 may support techniques for improved user experience and flexibility by allowing a user to select a programming language for interacting with a platform that supports a different programming language and for enabling multi-tenancy protections including the enforcement of tenant-specific computational limitations in environments designed for single tenancy.

Figure 7:
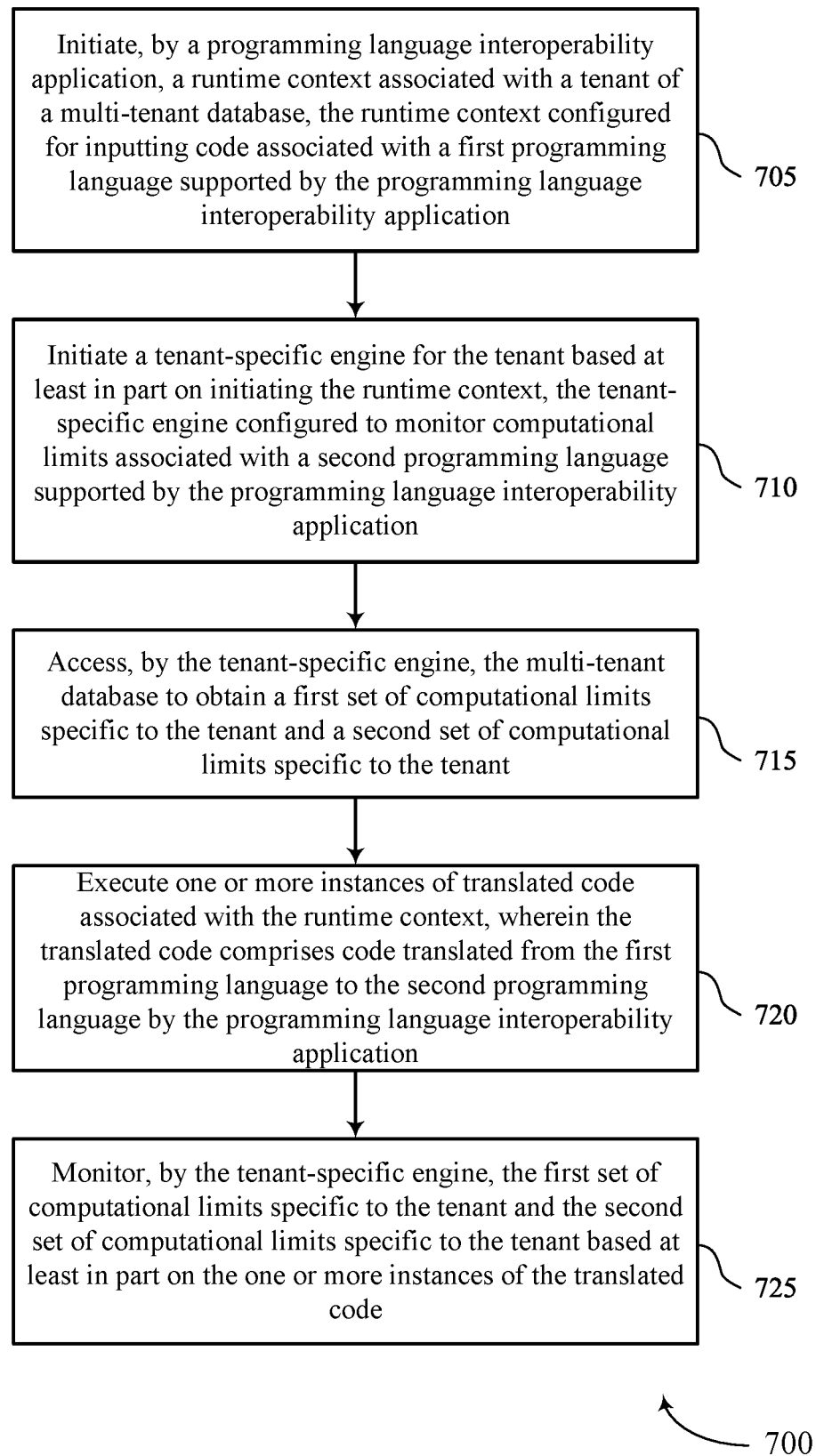
FIGS. 7 through 9 show flowcharts illustrating methods that support a programming language interoperability engine and enforcement in multi-tenant environments in accordance with aspects of the present disclosure.

FIG. 7 shows a flowchart illustrating a method 700 that supports programming a language interoperability engine and enforcement in multi-tenant environments in accordance with aspects of the present disclosure. The operations of the method 700 may be implemented by an application server or its components as described herein. For example, the operations of the method 700 may be performed by an application server as described with reference to FIGS. 1 through 6. In some examples, an application server may execute a set of instructions to control the functional elements of the application server to perform the described functions. Additionally or alternatively, the application server may perform aspects of the described functions using special-purpose hardware.

At 705, the method may include initiating, by a programming language interoperability application, a runtime context associated with a tenant of a multi-tenant database, the runtime context configured for inputting code associated with a first programming language supported by the programming language interoperability application. The operations of 705 may be performed in accordance with examples as disclosed herein. In some examples, aspects of the operations of 705 may be performed by a context initiator 525 as described with reference to FIG. 5.

At 710, the method may include initiating a tenant-specific engine for the tenant based at least in part on initiating the runtime context, the tenant-specific engine configured to monitor computational limits associated with a second programming language supported by the programming language interoperability application. The operations of 710 may be performed in accordance with examples as disclosed herein. In some examples, aspects of the operations of 710 may be performed by an engine initiator 530 as described with reference to FIG. 5.

At 715, the method may include accessing, by the tenant-specific engine, the multi-tenant database to obtain a first set of computational limits specific to the tenant and a second set of computational limits specific to the tenant. The operations of 715 may be performed in accordance with examples as disclosed herein. In some examples, aspects of the operations of 715 may be performed by a database component 535 as described with reference to FIG. 5.

At 720, the method may include executing one or more instances of translated code associated with the runtime context, wherein the translated code comprises code translated from the first programming language to the second programming language by the programming language interoperability application. The operations of 720 may be performed in accordance with examples as disclosed herein. In some examples, aspects of the operations of 720 may be performed by an execution component 540 as described with reference to FIG. 5.

At 725, the method may include monitoring, by the tenant-specific engine, the first set of computational limits specific to the tenant and the second set of computational limits specific to the tenant based at least in part on the one or more instances of the translated code. The operations of 725 may be performed in accordance with examples as disclosed herein. In some examples, aspects of the operations of 725 may be performed by a limit monitor 545 as described with reference to FIG. 5.

Figure 8:
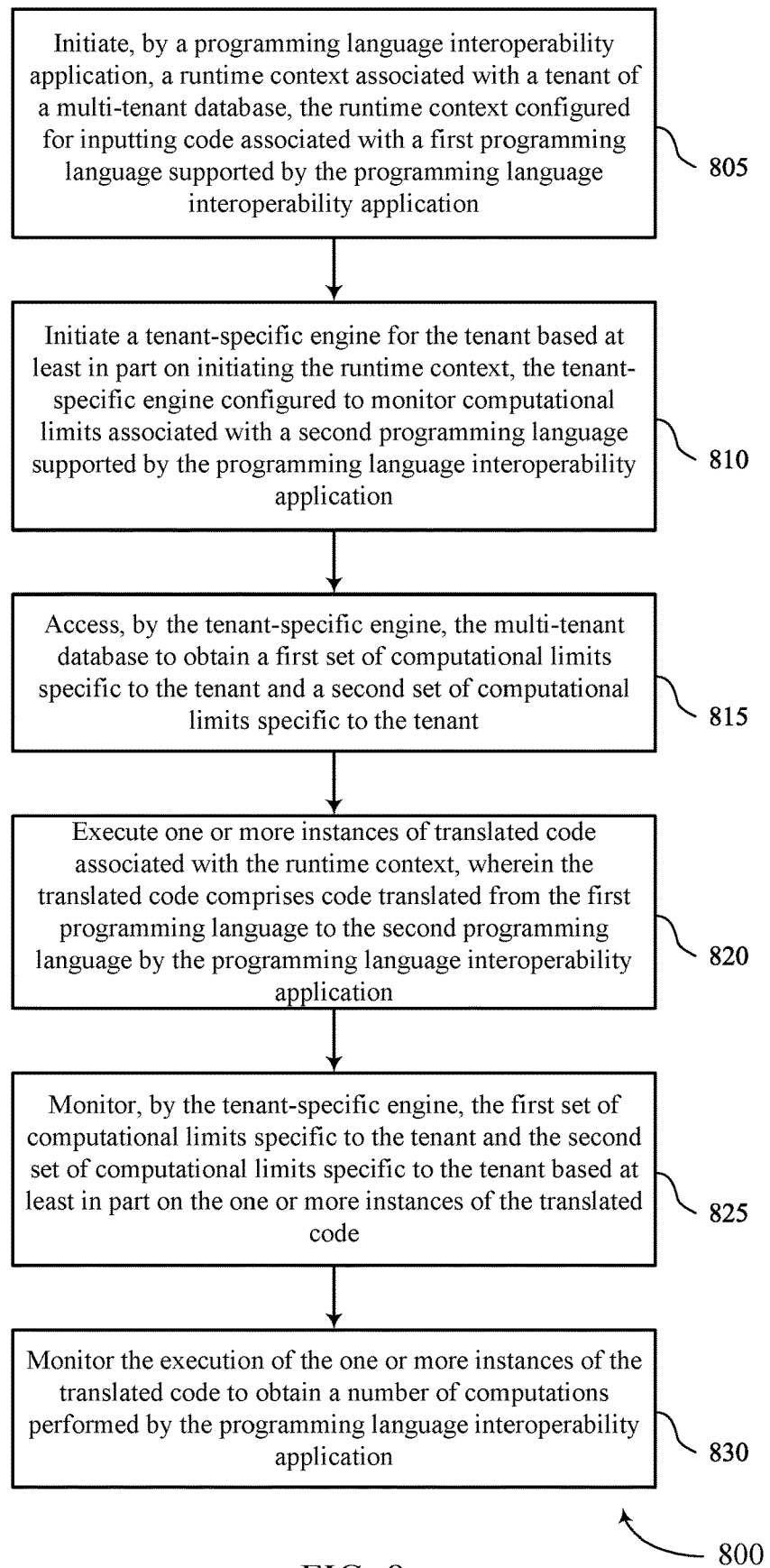

FIG. 8 shows a flowchart illustrating a method 800 that supports a programming language interoperability engine and enforcement in multi-tenant environments in accordance with aspects of the present disclosure. The operations of the method 800 may be implemented by an application server or its components as described herein. For example, the operations of the method 800 may be performed by an application server as described with reference to FIGS. 1 through 6. In some examples, an application server may execute a set of instructions to control the functional elements of the application server to perform the described functions. Additionally or alternatively, the application server may perform aspects of the described functions using special-purpose hardware.

At 805, the method may include initiating, by a programming language interoperability application, a runtime context associated with a tenant of a multi-tenant database, the runtime context configured for inputting code associated with a first programming language supported by the programming language interoperability application. The operations of 805 may be performed in accordance with examples as disclosed herein. In some examples, aspects of the operations of 805 may be performed by a context initiator 525 as described with reference to FIG. 5.

At 810, the method may include initiating a tenant-specific engine for the tenant based at least in part on initiating the runtime context, the tenant-specific engine configured to monitor computational limits associated with a second programming language supported by the programming language interoperability application. The operations of 810 may be performed in accordance with examples as disclosed herein. In some examples, aspects of the operations of 810 may be performed by an engine initiator 530 as described with reference to FIG. 5.

At 815, the method may include accessing, by the tenant-specific engine, the multi-tenant database to obtain a first set of computational limits specific to the tenant and a second set of computational limits specific to the tenant. The operations of 815 may be performed in accordance with examples as disclosed herein. In some examples, aspects of the operations of 815 may be performed by a database component 535 as described with reference to FIG. 5.

At 820, the method may include executing one or more instances of translated code associated with the runtime context, wherein the translated code comprises code translated from the first programming language to the second programming language by the programming language interoperability application. The operations of 820 may be performed in accordance with examples as disclosed herein. In some examples, aspects of the operations of 820 may be performed by an execution component 540 as described with reference to FIG. 5.

At 825, the method may include monitoring, by the tenant-specific engine, the first set of computational limits specific to the tenant and the second set of computational limits specific to the tenant based at least in part on the one or more instances of the translated code. The operations of 825 may be performed in accordance with examples as disclosed herein. In some examples, aspects of the operations of 825 may be performed by a limit monitor 545 as described with reference to FIG. 5.

At 830, the method may include monitoring the execution of the one or more instances of the translated code to obtain a number of computations performed by the programming language interoperability application. The operations of 830 may be performed in accordance with examples as disclosed herein. In some examples, aspects of the operations of 830 may be performed by a limit monitor 545 as described with reference to FIG. 5.

Figure 9:
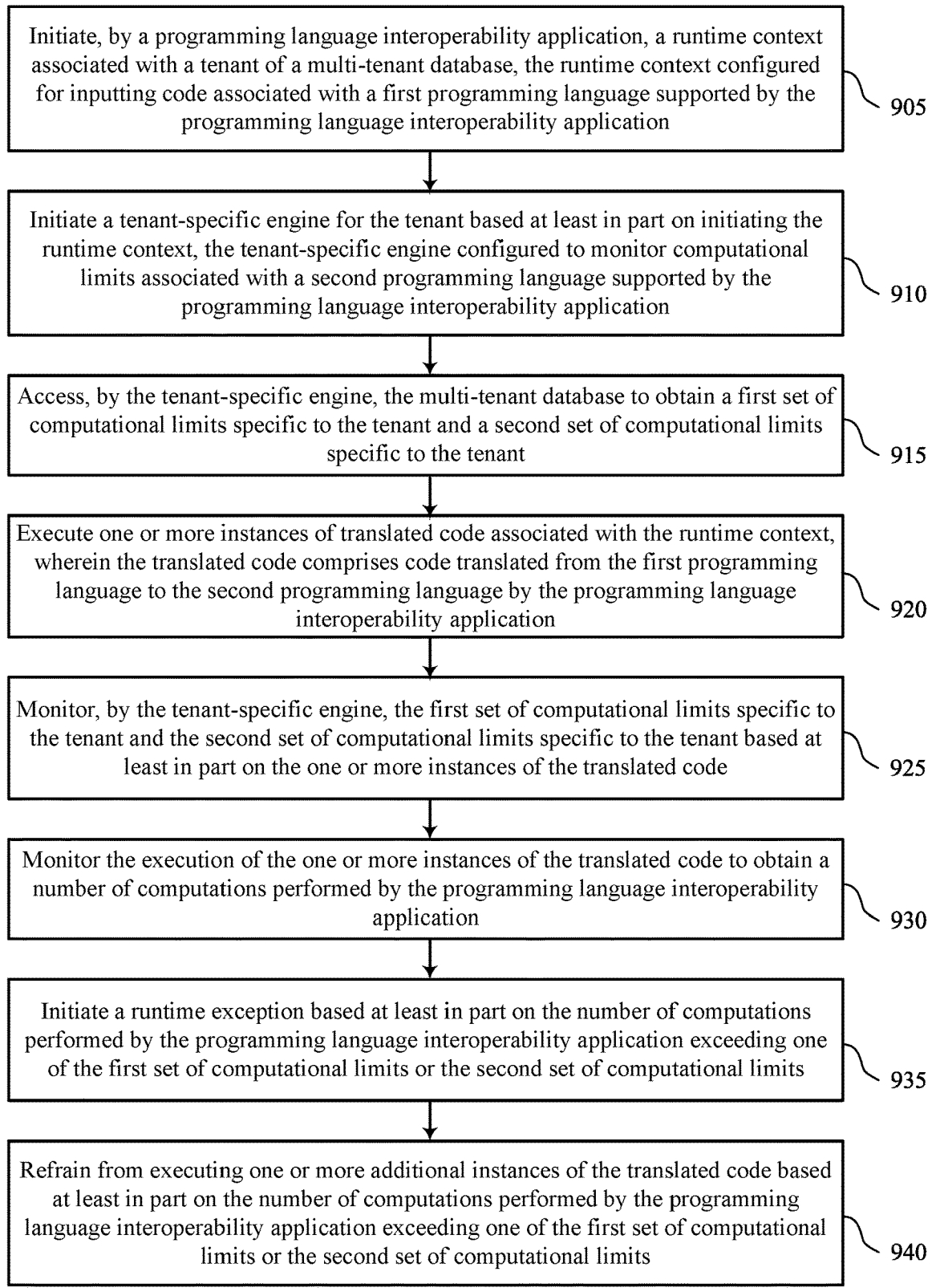

FIG. 9 shows a flowchart illustrating a method 900 that supports a programming language interoperability engine and enforcement in multi-tenant environments in accordance with aspects of the present disclosure. The operations of the method 900 may be implemented by an application server or its components as described herein. For example, the operations of the method 900 may be performed by an application server as described with reference to FIGS. 1 through 6. In some examples, an application server may execute a set of instructions to control the functional elements of the application server to perform the described functions. Additionally or alternatively, the application server may perform aspects of the described functions using special-purpose hardware.

At 905, the method may include initiating, by a programming language interoperability application, a runtime context associated with a tenant of a multi-tenant database, the runtime context configured for inputting code associated with a first programming language supported by the programming language interoperability application. The operations of 905 may be performed in accordance with examples as disclosed herein. In some examples, aspects of the operations of 905 may be performed by a context initiator 525 as described with reference to FIG. 5.

At 910, the method may include initiating a tenant-specific engine for the tenant based at least in part on initiating the runtime context, the tenant-specific engine configured to monitor computational limits associated with a second programming language supported by the programming language interoperability application. The operations of 910 may be performed in accordance with examples as disclosed herein. In some examples, aspects of the operations of 910 may be performed by an engine initiator 530 as described with reference to FIG. 5.

At 915, the method may include accessing, by the tenant-specific engine, the multi-tenant database to obtain a first set of computational limits specific to the tenant and a second set of computational limits specific to the tenant. The operations of 915 may be performed in accordance with examples as disclosed herein. In some examples, aspects of the operations of 915 may be performed by a database component 535 as described with reference to FIG. 5.

At 920, the method may include executing one or more instances of translated code associated with the runtime context, wherein the translated code comprises code translated from the first programming language to the second programming language by the programming language interoperability application. The operations of 920 may be performed in accordance with examples as disclosed herein. In some examples, aspects of the operations of 920 may be performed by an execution component 540 as described with reference to FIG. 5.

At 925, the method may include monitoring, by the tenant-specific engine, the first set of computational limits specific to the tenant and the second set of computational limits specific to the tenant based at least in part on the one or more instances of the translated code. The operations of 925 may be performed in accordance with examples as disclosed herein. In some examples, aspects of the operations of 925 may be performed by a limit monitor 545 as described with reference to FIG. 5.

At 930, the method may include monitoring the execution of the one or more instances of the translated code to obtain a number of computations performed by the programming language interoperability application. The operations of 930 may be performed in accordance with examples as disclosed herein. In some examples, aspects of the operations of 930 may be performed by a limit monitor 545 as described with reference to FIG. 5.

At 935, the method may include initiating a runtime exception based at least in part on the number of computations performed by the programming language interoperability application exceeding one of the first set of computational limits or the second set of computational limits. The operations of 935 may be performed in accordance with examples as disclosed herein. In some examples, aspects of the operations of 935 may be performed by an exception manager 555 as described with reference to FIG. 5.

At 940, the method may include refraining from executing one or more additional instances of the translated code based at least in part on the number of computations performed by the programming language interoperability application exceeding one of the first set of computational limits or the second set of computational limits. The operations of 940 may be performed in accordance with examples as disclosed herein. In some examples, aspects of the operations of 940 may be performed by an execution component 540 as described with reference to FIG. 5.

A method for data processing at an application server is described. The method may include initiating, by a programming language interoperability application, a runtime context associated with a tenant of a multi-tenant database, the runtime context configured for inputting code associated with a first programming language supported by the programming language interoperability application, initiating a tenant-specific engine for the tenant based at least in part on initiating the runtime context, the tenant-specific engine configured to monitor computational limits associated with a second programming language supported by the programming language interoperability application, accessing, by the tenant-specific engine, the multi-tenant database to obtain a first set of computational limits specific to the tenant and a second set of computational limits specific to the tenant, executing one or more instances of translated code associated with the runtime context, wherein the translated code comprises code translated from the first programming language to the second programming language by the programming language interoperability application, and monitoring, by the tenant-specific engine, the first set of computational limits specific to the tenant and the second set of computational limits specific to the tenant based at least in part on the one or more instances of the translated code.

An apparatus for data processing at an application server is described. The apparatus may include a processor, memory coupled with the processor, and instructions stored in the memory. The instructions may be executable by the processor to cause the apparatus to initiate, by a programming language interoperability application, a runtime context associated with a tenant of a multi-tenant database, the runtime context configured for inputting code associated with a first programming language supported by the programming language interoperability application, initiate a tenant-specific engine for the tenant based at least in part on initiating the runtime context, the tenant-specific engine configured to monitor computational limits associated with a second programming language supported by the programming language interoperability application, accessing, by the tenant-specific engine, the multi-tenant database to obtain a first set of computational limits specific to the tenant and a second set of computational limits specific to the tenant, execute one or more instances of translated code associated with the runtime context, wherein the translated code comprises code translated from the first programming language to the second programming language by the programming language interoperability application, and monitor, by the tenant-specific engine, the first set of computational limits specific to the tenant and the second set of computational limits specific to the tenant based at least in part on the one or more instances of the translated code.

Another apparatus for data processing at an application server is described. The apparatus may include means for initiating, by a programming language interoperability application, a runtime context associated with a tenant of a multi-tenant database, the runtime context configured for inputting code associated with a first programming language supported by the programming language interoperability application, means for initiating a tenant-specific engine for the tenant based at least in part on initiating the runtime context, the tenant-specific engine configured to monitor computational limits associated with a second programming language supported by the programming language interoperability application, means for accessing, by the tenant-specific engine, the multi-tenant database to obtain a first set of computational limits specific to the tenant and a second set of computational limits specific to the tenant, means for executing one or more instances of translated code associated with the runtime context, wherein the translated code comprises code translated from the first programming language to the second programming language by the programming language interoperability application, and means for monitoring, by the tenant-specific engine, the first set of computational limits specific to the tenant and the second set of computational limits specific to the tenant based at least in part on the one or more instances of the translated code.

A non-transitory computer-readable medium storing code for data processing at an application server is described. The code may include instructions executable by a processor to initiate, by a programming language interoperability application, a runtime context associated with a tenant of a multi-tenant database, the runtime context configured for inputting code associated with a first programming language supported by the programming language interoperability application, initiate a tenant-specific engine for the tenant based at least in part on initiating the runtime context, the tenant-specific engine configured to monitor computational limits associated with a second programming language supported by the programming language interoperability application, accessing, by the tenant-specific engine, the multi-tenant database to obtain a first set of computational limits specific to the tenant and a second set of computational limits specific to the tenant, execute one or more instances of translated code associated with the runtime context, wherein the translated code comprises code translated from the first programming language to the second programming language by the programming language interoperability application, and monitor, by the tenant-specific engine, the first set of computational limits specific to the tenant and the second set of computational limits specific to the tenant based at least in part on the one or more instances of the translated code.

In some examples of the method, apparatuses, and non-transitory computer-readable medium described herein, monitoring the first set of computational limits specific to the tenant and the second set of computational limits specific to the tenant may include operations, features, means, or instructions for monitoring the execution of the one or more instances of the translated code to obtain a number of computations performed by the programming language interoperability application.

Some examples of the method, apparatuses, and non-transitory computer-readable medium described herein may further include operations, features, means, or instructions for initiating a runtime exception based at least in part on the number of computations performed by the programming language interoperability application exceeding one of the first set of computational limits or the second set of computational limits.

Some examples of the method, apparatuses, and non-transitory computer-readable medium described herein may further include operations, features, means, or instructions for refraining from executing one or more additional instances of the translated code based at least in part on the number of computations performed by the programming language interoperability application exceeding one of the first set of computational limits or the second set of computational limits.

In some examples of the method, apparatuses, and non-transitory computer-readable medium described herein, executing, by the programming language interoperability application, the one or more instances of the translated code based at least in part on the first set of computational limits and monitoring, by the tenant-specific engine, the one or more instances of the translated code executed by the programming language interoperability application based at least in part on the second set of computational limits.

In some examples of the method, apparatuses, and non-transitory computer-readable medium described herein, the first set of computational limits comprises a processor time limit associated with the programming language interoperability application.

In some examples of the method, apparatuses, and non-transitory computer-readable medium described herein, the second set of computational limits comprises a memory usage limit associated with the runtime context, a number of statements limit associated with the runtime context, or a combination thereof.

In some examples of the method, apparatuses, and non-transitory computer-readable medium described herein, each of the first and second sets of computational limits may be based at least in part on a user type associated with the tenant, a tenant identifier (ID) of the tenant, a tenant status of the tenant, a code type of the first programming language, or any combination thereof.

Some examples of the method, apparatuses, and non-transitory computer-readable medium described herein may further include operations, features, means, or instructions for inputting the code associated with the first programming language to the runtime context and translating, by the programming language interoperability application, one or more statements of the code associated with the first programming language to obtain the one or more instances of translated code.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing at an application server, comprising:
    initiating, by a programming language interoperability application, a runtime context associated with a tenant of a multi-tenant database, the runtime context configured for inputting code associated with a first programming language supported by the programming language interoperability application;
    initiating a tenant-specific engine for the tenant based at least in part on initiating the runtime context, the tenant-specific engine configured to monitor computational limits associated with a second programming language supported by the programming language interoperability application;
    accessing, by the tenant-specific engine, the multi-tenant database to obtain a first set of computational limits specific to the tenant and a second set of computational limits specific to the tenant;
    executing one or more instances of translated code associated with the runtime context, wherein the translated code comprises code translated from the first programming language to the second programming language by the programming language interoperability application; and
    monitoring, by the tenant-specific engine, the first set of computational limits specific to the tenant and the second set of computational limits specific to the tenant based at least in part on the one or more instances of the translated code.

2. The method of claim 1, wherein monitoring the first set of computational limits specific to the tenant and the second set of computational limits specific to the tenant comprises:
    monitoring the execution of the one or more instances of the translated code to obtain a number of computations performed by the programming language interoperability application.

3. The method of claim 2, further comprising:
    initiating a runtime exception based at least in part on the number of computations performed by the programming language interoperability application exceeding one of the first set of computational limits or the second set of computational limits.

4. The method of claim 3, further comprising:
    refraining from executing one or more additional instances of the translated code based at least in part on the number of computations performed by the programming language interoperability application exceeding one of the first set of computational limits or the second set of computational limits.

5. The method of claim 1, further comprising:
    executing, by the programming language interoperability application, the one or more instances of the translated code based at least in part on the first set of computational limits; and
    monitoring, by the tenant-specific engine, the one or more instances of the translated code executed by the programming language interoperability application based at least in part on the second set of computational limits.

6. The method of claim 1, wherein the first set of computational limits comprises a processor time limit associated with the programming language interoperability application.

7. The method of claim 1, wherein the second set of computational limits comprises a memory usage limit associated with the runtime context, a number of statements limit associated with the runtime context, or a combination thereof.

8. The method of claim 1, wherein each of the first and second sets of computational limits is based at least in part on a user type associated with the tenant, a tenant identifier (ID) of the tenant, a tenant status of the tenant, a code type of the first programming language, or any combination thereof.

9. The method of claim 1, further comprising:
    inputting the code associated with the first programming language to the runtime context; and
    translating, by the programming language interoperability application, one or more statements of the code associated with the first programming language to obtain the one or more instances of translated code.

10. An apparatus for data processing at an application server, comprising:
    a processor;
    memory coupled with the processor; and
    instructions stored in the memory and executable by the processor to cause the apparatus to:
        initiate, by a programming language interoperability application, a runtime context associated with a tenant of a multi-tenant database, the runtime context configured for inputting code associated with a first programming language supported by the programming language interoperability application;

initiate a tenant-specific engine for the tenant based at least in part on initiating the runtime context, the tenant-specific engine configured to monitor computational limits associated with a second programming language supported by the programming language interoperability application;

access, by the tenant-specific engine, the multi-tenant database to obtain a first set of computational limits specific to the tenant and a second set of computational limits specific to the tenant;

execute one or more instances of translated code associated with the runtime context, wherein the translated code comprises code translated from the first programming language to the second programming language by the programming language interoperability application; and monitor, by the tenant-specific engine, the first set of computational limits specific to the tenant and the second set of computational limits specific to the tenant based at least in part on the one or more instances of the translated code.

11. The apparatus of claim 10, wherein the instructions to monitor the first set of computational limits specific to the tenant and the second set of computational limits specific to the tenant are executable by the processor to cause the apparatus to:

monitor the execution of the one or more instances of the translated code to obtain a number of computations performed by the programming language interoperability application.

12. The apparatus of claim 11, wherein the instructions are further executable by the processor to cause the apparatus to:

initiate a runtime exception based at least in part on the number of computations performed by the programming language interoperability application exceeding one of the first set of computational limits or the second set of computational limits.

13. The apparatus of claim 12, wherein the instructions are further executable by the processor to cause the apparatus to:

refrain from executing one or more additional instances of the translated code based at least in part on the number of computations performed by the programming language interoperability application exceeding one of the first set of computational limits or the second set of computational limits.

14. The apparatus of claim 10, wherein the instructions are further executable by the processor to cause the apparatus to:

execute, by the programming language interoperability application, the one or more instances of the translate code based at least in part on the first set of computational limits; and monitor, by the tenant-specific engine, the one or more instances of the translated code executed by the programming language interoperability application based at least in part on the second set of computational limits.

15. The apparatus of claim 10, wherein the first set of computational limits comprises a processor time limit associated with the programming language interoperability application.

16. The apparatus of claim 10, wherein the second set of computational limits comprises a memory usage limit associated with the runtime context, a number of statements limit associated with the runtime context, or a combination thereof.

17. The apparatus of claim 10, wherein each of the first and second sets of computational limits is based at least in part on a user type associated with the tenant, a tenant identifier (ID) of the tenant, a tenant status of the tenant, a code type of the first programming language, or any combination thereof.

18. The apparatus of claim 10, wherein the instructions are further executable by the processor to cause the apparatus to:

input the code associated with the first programming language to the runtime context; and translate, by the programming language interoperability application, one or more statements of the code associate with the first programming language to obtain the one or more instances of translated code.

19. A non-transitory computer-readable medium storing code for data processing at an application server, the code comprising instructions executable by a processor to:

initiate, by a programming language interoperability application, a runtime context associated with a tenant of a multi-tenant database, the runtime context configured for inputting code associated with a first programming language supported by the programming language interoperability application;

initiate a tenant-specific engine for the tenant based at least in part on initiating the runtime context, the tenant-specific engine configured to monitor computational limits associated with a second programming language supported by the programming language interoperability application;

access, by the tenant-specific engine, the multi-tenant database to obtain a first set of computational limits specific to the tenant and a second set of computational limits specific to the tenant;

execute one or more instances of translated code associated with the runtime context, wherein the translated code comprises code translated from the first programming language to the second programming language by the programming language interoperability application; and monitor, by the tenant-specific engine, the first set of computational limits specific to the tenant and the second set of computational limits specific to the tenant based at least in part on the one or more instances of the translated code.

20. The non-transitory computer-readable medium of claim 19, wherein the instructions to monitor the first set of computational limits specific to the tenant and the second set of computational limits specific to the tenant are executable by the processor to:

monitor the execution of the one or more instances of the translated code to obtain a number of computations performed by the programming language interoperability application.

* * * * *